(12) United States Patent
Christ

(10) Patent No.: US 11,993,142 B2
(45) Date of Patent: May 28, 2024

(54) MOTOR VEHICLE HAVING A PRESSURE RELIEF DEVICE THAT CAN BE THERMALLY ACTIVATED, AND METHOD FOR PRESSURE RELIEF

(71) Applicant: Bayerische Motoren Werke Aktiengesellschaft, Munich (DE)

(72) Inventor: Timo Christ, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 872 days.

(21) Appl. No.: 17/045,314

(22) PCT Filed: Mar. 11, 2019

(86) PCT No.: PCT/EP2019/056004
§ 371 (c)(1),
(2) Date: Oct. 5, 2020

(87) PCT Pub. No.: WO2019/192804
PCT Pub. Date: Oct. 10, 2019

(65) Prior Publication Data
US 2021/0146774 A1 May 20, 2021

(30) Foreign Application Priority Data
Apr. 6, 2018 (DE) ...................... 10 2018 205 190.9

(51) Int. Cl.
*B60K 15/03* (2006.01)
*B60K 15/063* (2006.01)

(52) U.S. Cl.
CPC ...... *B60K 15/03006* (2013.01); *B60K 15/063* (2013.01); *B60K 2015/03013* (2013.01);
(Continued)

(58) Field of Classification Search
CPC ............ B60K 15/03006; B60K 15/063; B60K 2015/03013; B60K 2015/03026;
(Continued)

(56) References Cited

U.S. PATENT DOCUMENTS

| 6,257,360 B1 * | 7/2001 | Wozniak ............. B60K 15/013 180/69.5 |
| 7,762,272 B2 | 7/2010 | Delfino et al. |

(Continued)

FOREIGN PATENT DOCUMENTS

| CN | 103972530 A | 8/2014 |
| CN | 106574742 A | 4/2017 |

(Continued)

OTHER PUBLICATIONS

International Search Report (PCT/ISA/210) issued in PCT Application No. PCT/EP2019/056004 dated May 29, 2019 with English translation (five (5) pages).
(Continued)

*Primary Examiner* — Kelsey E Cary
(74) *Attorney, Agent, or Firm* — Crowell & Moring LLP

(57) ABSTRACT

A motor vehicle has a pressure relief device that can be thermally activated, for the pressure relief of at least one pressure vessel. A body floor element is arranged at least partially between the passenger compartment or the cargo area and the pressure vessel. A pressure relief triggering device is designed to directly or indirectly bring about the pressure relief. The pressure relief triggering device is designed to absorb thermal energy from the passenger compartment or the cargo area in order to trigger the pressure relief device, without the thermal energy absorbed for the triggering having previously been transmitted to the pressure relief triggering device through the body floor element.

15 Claims, 2 Drawing Sheets

(52) U.S. Cl.
CPC ............... *B60K 2015/03026* (2013.01); *B60K 2015/03296* (2013.01); *B60K 2015/0634* (2013.01)

(58) Field of Classification Search
CPC .. B60K 2015/03296; B60K 2015/0634; B60K 2015/03256; B60K 2015/03309; B60K 2015/03315; B60K 2015/03375; B60K 2015/03381; B60K 2015/0638
USPC .......................................................... 137/899
See application file for complete search history.

(56) References Cited

U.S. PATENT DOCUMENTS

| | | | |
|---|---|---|---|
| 2009/0101314 | A1 | 4/2009 | Lindner |
| 2011/0120736 | A1 | 5/2011 | Lee et al. |
| 2011/0180551 | A1 | 7/2011 | Handa |
| 2014/0097260 | A1 | 4/2014 | Veenstra |
| 2014/0220469 | A1* | 8/2014 | Heise ................ H01M 8/04201 137/72 |
| 2016/0185210 | A1 | 6/2016 | Lee |
| 2017/0167662 | A1 | 6/2017 | Schwartz |
| 2018/0147935 | A1* | 5/2018 | Okawachi ........ B60K 15/03006 |
| 2018/0328540 | A1 | 11/2018 | Hettenkofer |
| 2019/0219187 | A1 | 7/2019 | Kunberger et al. |

FOREIGN PATENT DOCUMENTS

| | | |
|---|---|---|
| DE | 10 2006 009 537 B3 | 5/2007 |
| DE | 10 2008 051 963 A1 | 5/2009 |
| DE | 10 2015 218 231 A1 | 3/2017 |
| DE | 10 2015 222 252 A1 | 5/2017 |
| DE | 10 2016 213 288 A1 | 10/2017 |
| DE | 10 2016 215 318 A1 | 2/2018 |
| DE | 10 2016 217 028 A1 | 3/2018 |
| DE | 10 2016 218 692 A1 | 3/2018 |
| DE | 10 2016 222 668 A1 | 5/2018 |
| DE | 10 2017 205 645 A1 | 10/2018 |
| DE | 10 2018 203 183 A1 | 9/2019 |
| EP | 0 668 468 A1 | 8/1995 |
| FR | 2 895 488 A1 | 6/2007 |
| JP | 2007-112180 A | 5/2007 |
| KR | 10-2017-0143323 A | 12/2017 |
| WO | WO 2013/045022 A2 | 4/2013 |
| WO | WO 2017/080725 A1 | 5/2017 |

OTHER PUBLICATIONS

German-language Written Opinion (PCT/ISA/237) issued in PCT Application No. PCT/EP2019/056004 dated May 29, 2019 (six (6) pages).

German-language Search Report issued in German Application No. 10 2018 205 190.9 dated Mar. 3, 2022 with partial English translation (10 pages).

Chinese-language Office Action issued in Chinese Application No. 201980020938.0 dated Feb. 8, 2023 with English translation (18 pages).

Chinese-language Office Action issued in Chinese Application No. 201980020938 dated Aug. 31, 2023 with English translation (16 pages).

* cited by examiner

MOTOR VEHICLE HAVING A PRESSURE RELIEF DEVICE THAT CAN BE THERMALLY ACTIVATED, AND METHOD FOR PRESSURE RELIEF

BACKGROUND AND SUMMARY OF THE INVENTION

The technology disclosed herein relates to a motor vehicle with a pressure relief device which can be activated thermally for the pressure relief of at least one pressure vessel, and to a method for the pressure relief.

A motor vehicle of the above type can be, for example, a motor vehicle which is operated by fuel cell (FCEV). If a thermal event occurs in the vehicle interior, the aim is that the fuel which, as a rule is gaseous, is discharged from the pressure vessel before the thermal event acts on the load-bearing fiber composite layers of the pressure vessel. To this end, pressure relief valves ("thermal pressure relief device" (=TPRD)) are known from the prior art which bring about a pressure relief from a defined temperature.

It is one preferred object of the technology disclosed herein to reduce or to eliminate at least one disadvantage of a previously known solution, or to propose an alternative solution. In particular, it is one preferred object of the technology disclosed herein to bring about a pressure relief of the at least one pressure vessel in the case of a thermal event in the vehicle interior in a comparatively rapid and/or reliable manner, preferably without or with merely small negative effects on the installation space, the weight and/or the costs. Further preferred objects can arise from the advantageous effects of the technology disclosed herein. The object/objects is/are achieved by way of the subject matter of the independent patent claims. The dependent claims provide preferred refinements.

The technology disclosed herein relates to a motor vehicle with a pressure relief device which can be activated thermally for the pressure relief of at least one pressure vessel, a vehicle body floor element being arranged at least in regions
i) between the passenger interior compartment and the pressure vessel, and/or
ii) between the trunk and the pressure vessel;
a pressure relief trigger being set up to bring about the pressure relief directly or indirectly without electric current and/or without an electric signal; the pressure relief trigger being set up to absorb thermal energy from the passenger interior compartment and/or trunk in order to trigger the pressure relief device, without the thermal energy which is absorbed for the triggering having previously been transmitted by way of the vehicle body floor element to the pressure relief trigger.

Triggering of this type is advantageously more rapid than conventional triggering, in the case of which the thermal energy is first of all absorbed by the vehicle body floor element and is subsequently output to a TPRD. The proposed solution is further advantageously a purely mechanically/thermally triggering apparatus without electric signal processing. A system of this type is very reliable.

The motor vehicle can be, for example, a passenger car, a motorcycle or a commercial vehicle. The motor vehicle comprises at least one pressure vessel. The pressure vessels including their peripheral components are as a rule called a pressure vessel system.

The at least one pressure vessel serves to store fuel which is gaseous under ambient conditions, for example compressed natural gas (CNG) or liquefied natural gas (LNG) or hydrogen. The pressure vessel can be, for example, a composite overwrapped pressure vessel (=COPV). The pressure vessel can be, for example, a cryogenic pressure vessel (=CcH2 or COP) or a high pressure gas vessel (=CGH2). High pressure gas vessels are configured to store fuel at ambient temperatures permanently at a nominal operating pressure (also called nominal working pressure or NWP) of approximately 350 bar positive pressure (=positive pressure with respect to atmospheric pressure), further preferably of approximately 700 bar positive pressure or more. A cryogenic pressure vessel is suitable for storing the fuel at the abovementioned operating pressures even at temperatures which lie considerably below the operating temperature of the motor vehicle.

The pressure relief is the operation, by way of which the pressure in the pressure vessel is decreased on account of an event. The event is, in particular, not the removal as intended for the supply of an energy converter, but rather, in particular, a failure (for example, a thermal event). The pressure relief as a rule begins with the at least partial opening of a valve and/or a bursting element which is directly connected fluidically to the pressure vessel.

The pressure relief can preferably take place by way of at least one pressure relief device of the motor vehicle. If a failure occurs on account of a malfunction of another component and/or as a result of an external thermal and/or mechanical action (for example, accident, local flame, etc.), the pressure relief device is set up to decrease the pressure in the pressure vessel system, in particular in the at least one pressure vessel. The pressure relief device is connected fluidically to the at least one pressure vessel. The pressure relief device can expediently be set up, in order to relieve the pressure of the pressure vessel, to enable the fuel removal mass flow which is greater (for example, higher at least by the factor 1.5, 2, 5, 10, 100 or more) than the maximum fuel removal mass flow through the removal path to the at least one energy converter (as a rule through a tank shut-off valve). The at least one pressure relief device is as a rule not used for the filling of the pressure vessel system and/or for the removal of fuel for the provision of energy in the motor vehicle during operation without a failure. A flow path which is parallel to the anode subsystem can expediently be utilized for the pressure release. The pressure vessel interior pressure is as a rule lowered to atmospheric pressure by way of the pressure relief.

The pressure relief apparatus can be a pressure relief device which can be activated thermally. The pressure relief device which can be activated thermally (also called a thermal pressure relief device (=TPRD) or a thermal fuse) is as a rule provided adjacently with respect to the pressure vessel. In the case of the action of heat (for example, by way of flames), the fuel which is stored in the pressure vessel is discharged into the surroundings by way of the TPRD. The pressure relief device discharges the fuel as soon as the triggering temperature of the TPRD is exceeded (=is thermally activated).

The passenger interior compartment (also called the passenger cabin) is that interior compartment of the motor vehicle, in which the vehicle occupants are located. The vehicle interior compartment is as a rule configured by way of the vehicle body substructure, the vehicle roof, the vehicle pillars which are situated in between, doors, hatches and further vehicle body parts for the separation of the passenger interior compartment from the surrounding area.

The vehicle body floor element is a part of the vehicle body which expediently at least partially configures the vehicle body substructure. The vehicle body floor element is as a rule a panel or a metal sheet. In one refinement, the vehicle body floor element at least partially configures the central tunnel of the motor vehicle. In a further refinement, the vehicle body floor element in the region of the rear seats at least partially configures the boundary between the passenger interior compartment or trunk and the vehicle undertray. The vehicle body floor element is particularly preferably produced from a metallic material from a metal alloy. In accordance with the technology disclosed herein, the vehicle body floor element is arranged at least in regions between the passenger interior compartment or trunk and the at least one pressure vessel.

The technology disclosed herein comprises, furthermore, a pressure relief trigger. The pressure relief trigger is set up to bring about the pressure relief directly or indirectly without electric current. The pressure relief trigger can be set up to absorb the thermal energy from the passenger interior compartment or trunk in order to trigger the opening element, without the thermal energy which is absorbed for the triggering having previously been transmitted by way of the vehicle body floor element to the pressure relief trigger.

In particular, the pressure relief trigger can comprise a triggering medium which is heated by way of the thermal energy which is generated in the interior of the passenger interior compartment or trunk. By way of said heat absorption, for example, one of the following variables of the triggering medium can change:
volume of the heated triggering medium;
physical state of the heated triggering medium;
pressure of the triggering medium within the pressure relief trigger; and/or
temperature of the heated triggering medium.

The pressure relief trigger can expediently be designed in such a way that it is heated by way of the absorption of thermal energy to a temperature which is higher than or equal to the triggering temperature of the pressure relief device or the opening element.

In one refinement, at least one surface of the pressure relief trigger can be arranged at least partially in the passenger interior compartment or trunk. As an alternative, at least one surface can be recessed into the vehicle body floor element. The at least one surface is expediently set up to at least partially directly absorb the thermal energy which is emitted directly by the thermal event, for example via thermal radiation or via the air in the passenger interior compartment or trunk.

In other words, it is therefore advantageously provided that at least one pressure relief trigger is arranged closer to the passenger interior compartment or trunk than the pressure relief device which can be thermally activated itself. Once again in other words, the pressure relief trigger is therefore advantageously not arranged, like a conventional TPRD, below the vehicle body floor element without mechanical contact to the latter in such a way that the thermal energy from the passenger interior compartment or trunk is absorbed merely indirectly via the vehicle body floor element.

The pressure relief trigger can be set up, for the pressure release of the at least one pressure vessel, to output the thermal energy which is absorbed from the passenger interior compartment or trunk at least partially to the opening element. To this end, a triggering medium which is stored in the pressure relief trigger can expediently at least partially absorb the thermal energy from the passenger interior compartment or trunk, and can transport it to the opening element. In particular, the pressure relief trigger can be designed in such a way that the triggering medium itself is transported for the transport of the thermal energy. In particular, so much thermal energy can be output to the opening element that the opening element is activated thermally and the pressure relief occurs.

The pressure relief trigger can particularly preferably be configured and arranged in such a way that the triggering medium which is stored in the pressure relief trigger can be brought at least partially into contact with the opening element for the thermal activation of the opening element. In one refinement, the pressure relief trigger can be configured and arranged in such a way that the triggering medium can flow onto or around the opening element for the thermal activation.

The triggering medium can have a solid or liquid physical state if the temperature of the triggering medium is lower than a limit temperature, the limit temperature being able to be indicative of a thermal event in the passenger interior compartment or trunk. As an alternative or in addition, the triggering medium can have a liquid or gaseous physical state if the temperature of the triggering medium reaches or exceeds the limit temperature. The limit temperature can be higher, for example, at least by the factor 1.2 or at least by the factor 1.5 or at least by the factor 2 or at least by the factor 4 than the triggering temperature of the pressure relief device which can be activated thermally or of the opening element.

The pressure relief device has at least one opening element which can be activated or actuated thermally. In accordance with the technology disclosed herein, the pressure relief trigger can be set up to activate the opening element thermally for the pressure relief. In the case of the thermal activation, usually at a triggering temperature of approximately 110° C. and more, the opening elements change their shape or are destroyed (=thermal activation). As a result, the pressure relief device opens. The opening element can change its shape as a result of the thermal activation. As an alternative or in addition, the opening element can be destroyed by way of thermal activation. Within the context of the technology disclosed herein, the term "opening element" is restricted to the field of the pressure relief device which can have its shape changed or can be destroyed by way of the thermal activation. In the closed state of the pressure relief device, the opening element brings it about directly or indirectly that the pressure relief device does not release a flow path from the interior of the pressure vessel to the surrounding area. In the case of the indirect closure, the opening element holds a valve body, for example, the valve body in turn closing the pressure relief device.

The opening element is expediently configured in such a way that it opens at a triggering temperature, for example of 110° C. (that is to say, it releases the flow path from the interior of the pressure vessel to the surrounding area). The triggering temperature is selected in such a way that, in the case of a thermal event, for example a vehicle fire, bursting of the pressure vessel as a result of thermal structural weakening is avoided. The opening element can be configured, for example, as a glass ampule. A glass ampule of this type is a fluid-filled bursting body. The glass ampule has a closed fluid volume which is surrounded by a material (for example, glass) which is comparatively brittle or fragile even at the triggering temperature. The material for the glass ampule is not restricted to "glass", but rather any material can be selected which is sufficiently brittle. The fluid volume is filled with a fluid which expands to a comparatively pronounced extent in the case of heating. If the temperature then rises to the triggering temperature, the glass ampule breaks and therefore brings about the triggering of the pressure relief device (=release of the flow path to the surrounding area). As an alternative or in addition, a fusible link can be provided. If the temperature in the pressure relief device rises to the triggering temperature, the fusible link becomes soft. The softened fusible link is deformed by way of a force which is generated directly or indirectly by the pressure vessel interior pressure. This deformation of the fusible link brings about triggering of the pressure relief device.

Pressure relief devices with opening elements of this type are disclosed, for example, in German patent applications DE 10 2016 217 028, DE 10 2016 213 288, DE 10 2016 218 692, DE 10 2016 222 668 and DE 10 2017 205 645, the contents of which with regard to the pressure relief device and/or the opening element are hereby incorporated by reference.

The pressure relief trigger disclosed herein can have at least one closure. The closure can be set up to melt or to burst in the case of the triggering temperature being reached or exceeded. The closure can preferably be configured as a fusible disk or as a rupture disk. In particular, the triggering medium can be such that the pressure in the pressure relief trigger rises above a defined temperature to a value, at which the rupture disk breaks.

The pressure relief trigger can expediently be arranged and configured in such a way that the triggering medium flows out for the pressure relief solely as a result of gravity and/or a pressure difference between the triggering medium and the surrounding area. To this end, the closure can advantageously be provided at the lowest point in the installed position of the pressure relief trigger. The pressure relief trigger is expediently configured above the pressure relief device which can be activated thermally in the direction of the vehicle vertical axis.

It can be provided in one refinement that the pressure relief trigger comprises a triggering line, the triggering line or an element which is operatively or fluidically connected to it is guided at least partially through the vehicle body floor element.

A system of this type for the thermal pressure relief with a triggering line is disclosed, for example, in the German patent application with the publication number DE 10 2015222252 A1.

The triggering line can be a line, in particular a pipe, which preferably extends at least in regions over the surface of the pressure vessel. The triggering line preferably extends at least partially over a center region or shell region of the pressure vessel. The center region is as a rule of cylindrical configuration and/or is arranged between the ends of the pressure vessel. The triggering line preferably runs at least in regions in the axial direction and/or in the circumferential direction of the pressure vessel. The triggering line particularly preferably runs in a helical or spiral or serpentine manner over the surface of the pressure vessel. Adjacent sections of the triggering line are preferably spaced apart in such a way that a thermal event which occurs between these adjacent sections is detected reliably and the safety valve discharges the fuel gas reliably before the pressure vessel is damaged.

A first triggering line which is connected to a pressure relief unit of a first pressure vessel particularly preferably extends at least partially over the surface (for example, over the center regions or shell regions) of a second pressure vessel. Therefore, a single triggering line can advantageously detect thermal events on the two pressure vessels and can bring about a pressure relief of a pressure vessel.

A triggering line can preferably connect the respective pressure relief unit of the pressure vessels to one another in order to configure a common fluid system. A construction of this type can be realized in a particularly compact and inexpensive manner. One end of the triggering line is therefore advantageously connected to a first pressure relief unit of the first pressure vessel, and a second end of the triggering line is connected to a second pressure relief unit of the second pressure vessel. A triggering line of this type particularly preferably runs at least partially through the center regions of the pressure vessels.

Two triggering lines can also be provided which are connected fluidically in each case via separate fluid systems to the respective valves of the respective pressure vessels. These triggering lines preferably likewise run over the first and second pressure vessel (in particular, over the center regions or shell regions thereof).

The triggering line can be, in particular, of pressure-resistant configuration, in particular in such a way that, on account of a pressure increase due to operation, the triggering line does not expand and/or is not damaged and/or does not close on account of a mechanical action which is not due to operation, insignificant expansions and mechanical effects being irrelevant for the function. In this way, a particularly operationally reliable safety valve can advantageously be realized.

The line is preferably manufactured from a metal. The line can further preferably be configured from a material with a melting point far above the triggering temperature. A triggering line which has a more pronounced thermal conductivity in the radial direction than in the axial direction of the triggering line is particularly preferred. In this way thermal conduction is advantageously forced into the substance which is described in the following text, whereas a thermal dissipation which is as a rule undesired along the triggering line can be reduced.

The triggering line can be filled with the triggering medium. Furthermore, it is conceivable that a heat pipe and a fuse are used as triggering lines.

The technology disclosed herein likewise relates to a method for the pressure relief of a motor vehicle, in particular of the motor vehicle disclosed herein with the pressure relief device disclosed herein and/or the opening element disclosed herein and at least one pressure vessel. The method comprises the steps:

thermal energy of a thermal event is absorbed at least partially by a triggering medium in the passenger interior compartment or in the trunk;

the triggering medium which is heated by way of the absorption is transported at least partially to an opening element of the pressure relief device (200), which opening element can be activated thermally; and the transported triggering medium subsequently outputs the thermal energy at least partially to the opening element, as a result of which the opening element is activated thermally.

Features which are disclosed in conjunction with the motor vehicle disclosed herein can likewise be used in the case of the method disclosed herein.

In other words, the technology disclosed herein relates to a technology for the pressure relief. In accordance with the technology disclosed herein, the high temperatures which occur in the case of a thermal event (for example, fire) can advantageously reach the TPRD/TPRDs more rapidly than the pressure store reinforcement. In one refinement, in the case of the technology disclosed herein, a principle based on thermal transport by way of mass flow is proposed. It is proposed to locate a medium in the interior compartment on the vehicle body panel as close as possible to the TPRD or TPRDs, which medium can directly absorb heat in the case of a thermal event and can be set in motion as a fluid in the case of a defined temperature being reached and can flow to the TPRD. The pressure relief can advantageously be triggered there by way of the high temperature of the fluid/triggering medium.

Non-combustible media with high boiling points and/or high thermal capacities can preferably be used as triggering medium. This is preferably a non-combustible triggering medium. The following solutions are preferred:

1. A liquid can be used as triggering medium, preferably hydrocarbons or oils, for example "Fluorinert PC70" by the company 3M. The liquid preferably has a liquid physical state both in the case of normal operation of the motor vehicle and in the case of a thermal event in the passenger interior compartment I or in the trunk K. The initiation of flow can take place, for example, by way of i) a fusible disk with a melting temperature somewhat just below the boiling point of the medium or by way of ii) rupturing of a rupture disk as a result of a volume increase of the liquid.

2. A fusible link can be used as triggering medium, for example metal, plastic or long-chain wax. The fusible link preferably has a melting point above the normal operating temperature. In particular, the fusible link can have a solid physical state in normal operation and can assume a liquid physical state in the case of a thermal event in the passenger interior compartment I or trunk K. The initiation of flow can take place, for example, by way of i) melting of the medium and/or by way of ii) a fusible disk with a higher melting temperature than the medium. In this way, sufficient heat can advantageously be introduced into the medium in every case, in order to avoid resolidification on the path to the TPRD.

3. Furthermore, a liquid with a boiling point not far above the customary motor vehicle operating temperatures can be used as triggering medium, for example water. In normal operation, the liquid can have the liquid physical state, whereas it can assume the gaseous physical state in the case of a thermal event in the passenger interior compartment I or trunk K. The initiation of flow can take place, for example, by way of rupture of a rupture disk at a pressure which is to be assigned to a sufficiently high steam temperature.

The vessel of the heat-transporting medium can be configured such that it is open or closed at the top (toward the interior compartment I), in order, in the open case, to also conduct hot air or combustion gases from the interior compartment to the TPRD in addition to and/or temporally after the flowing fluid. The fusible disk which has already been mentioned above can serve as a closure of that variant of the apparatus which is open at the top during the normal vehicle operation. The apparatus can be provided with as great a surface area as possible of the heat/fluid store in the interior compartment I (for example, by means of fins), in order to absorb heat as rapidly as possible. A hose connection from the vessel to the TPRD can conduct the fluid medium to the intended destination. There, the medium can be distributed by way of a diffuser, for example, or can be conducted through a heat exchanger which is integrated into the TPRD, in order to improve the thermal transfer of the medium to the TPRD.

In this way, the thermal barrier of the vehicle body sheet metal can advantageously be overcome more rapidly and/or more reliably. The heat input into the fiber reinforced layer from the pressure vessel up to the triggering of the TPRD can be decreased in this way.

The technology disclosed herein will now be described on the basis of the figures.

DETAILED DESCRIPTION OF THE DRAWINGS

Figure 1:
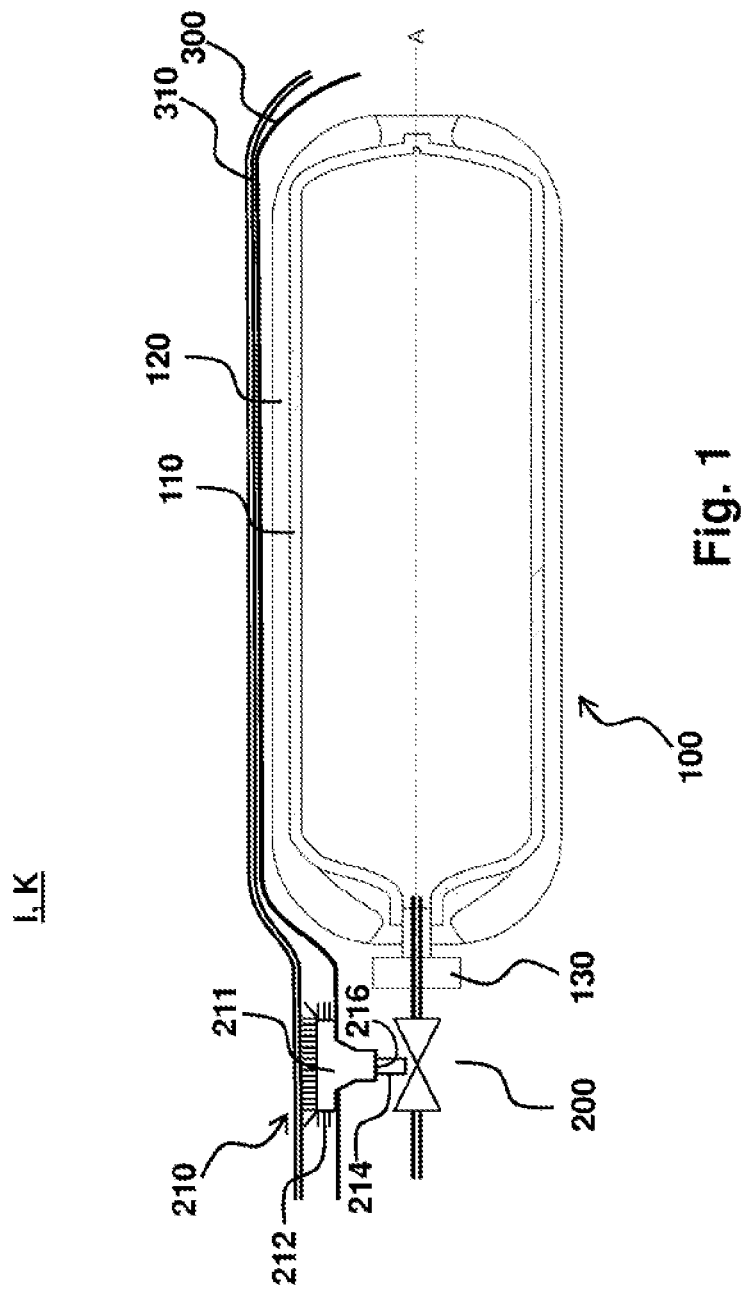
FIG. 1 shows a diagrammatic cross-sectional view of the technology disclosed herein.

FIG. 1 shows a diagrammatic cross-sectional view, in the case of which a pressure vessel 100 has a liner 110 and a fiber reinforced layer 120. The pressure vessel comprises a tank shut-off valve 130 which is inserted at one end of the pressure vessel 100 into a boss of the pressure vessel 100. The pressure vessel 100 and the tank shut-off valve 130 can have any suitable design.

The pressure vessel 100 is shielded from the passenger interior compartment I or trunk K by way of the vehicle body floor element 300. The vehicle body floor element 300 can be, for example, the central tunnel of a motor vehicle. It is likewise conceivable that the pressure vessel 100 is arranged below the vehicle seats or below the trunk K. Depending on the location of use, the vehicle body floor element 300 can be covered by a carpet material 310. Here, a pressure relief trigger 210 is recessed into the vehicle body floor element 300. Here, an upper surface of the pressure relief trigger 210 protrudes into the passenger interior compartment I or trunk K. The pressure relief trigger 210 which is shown here comprises an internal volume 211, in which the triggering medium is stored. In order to improve the thermal transfer, the pressure relief trigger 210 has a rib structure 212. The pressure relief trigger 210 comprises a closure 216 which is arranged at the lowest point on the underside of the pressure relief trigger 210. In the refinement which is shown here, in its installed position, the pressure relief trigger 210 is arranged directly above the pressure relief unit 200 which can be activated thermally, as viewed in the vehicle vertical axis. A triggering medium channel 214 serves to pour the triggering medium directly onto the opening element of the pressure relief device 200 which can be activated thermally. Any suitable medium can be used as triggering medium.

The pressure relief device 200 is set up, after being activated thermally, to release a flow path from the interior of the pressure vessel 100 to the surrounding area. Here, the filling and/or removal flow path/paths has/have been omitted for reasons of simplicity. They can be of any desired configuration. The pressure relief path is preferably of fluidic parallel configuration. In the embodiment which is shown here, merely one pressure relief device 200 is provided on the pressure vessel 100. A plurality of pressure relief devices 200 which can be activated thermally can likewise be provided on the pressure vessel 100. For example, in each case one pressure relief device 200 which can be activated thermally can be provided at each end. If a thermal event then occurs in the passenger interior compartment I or in the trunk K, the temperature of the triggering medium in the internal volume 211 can rise to a temperature which lies above the limit temperature (for example, 500° C.). If this is the case, the pressure in the internal volume 211 in one refinement can rise to such an extent that the closure 216 which is configured as a rupture disk is destroyed. The triggering medium which is then heated to a pronounced extent flows out of the pressure relief trigger 210 on account of gravity and/or a pressure difference between the triggering medium and the surrounding area, and is directed by way of the triggering medium channel 214 onto the opening element of the pressure relief device 200 which can be activated thermally. The triggering medium which has previously been heated by way of the thermal event outputs a part of the thermal energy to the opening element in the case of flowing onto or around the opening element. As a result, the opening element is heated to such an extent that the temperature of the opening element rises to a value which lies above the triggering temperature. In this way, the opening element is activated thermally. If, for example, a fusible link is provided, the fusible link melts and releases the pressure relief flow path of the pressure relief device 200 directly or indirectly. In comparison to the previously known solution, the thermal energy from the passenger interior compartment I or trunk K is therefore guided more rapidly and more directly to the TPRD. The TPRD can therefore trigger more rapidly and more reliably. In this way, the fuel can escape reliably before the fiber reinforced layer 120 is weakened by way of the thermal energy which is transmitted by way of the vehicle body floor element 300 to the fiber reinforced layer 120.

Figure 2:
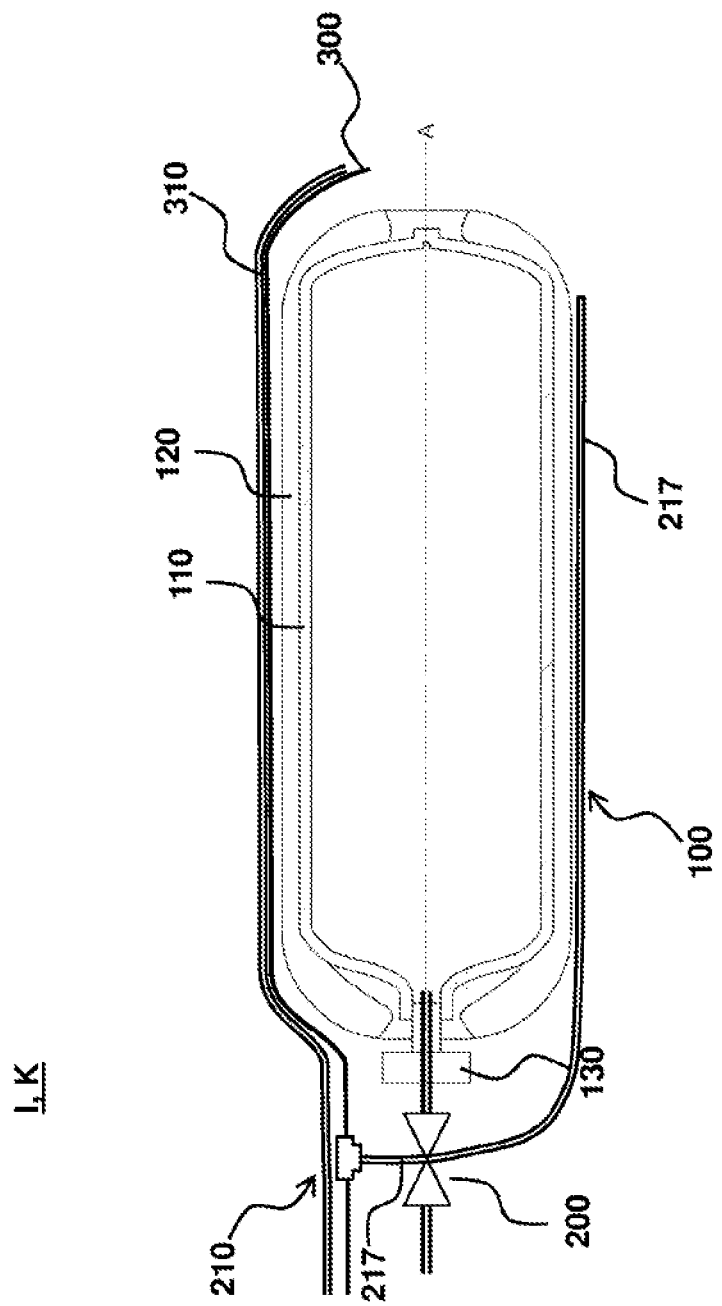
FIG. 2 shows a diagrammatic cross-sectional view of a further refinement of the technology disclosed herein.

In the following description of the alternative exemplary embodiment which is shown in FIG. 2, identical designations are used for features which are identical and/or at least comparable in terms of their configuration and/or method of operation in comparison with the first exemplary embodiment which is shown in FIG. 1. Unless they are described in detail once again, their configuration and/or method of operation corresponds to the configuration and/or method of operation of the features which have already been described above.

FIG. 2 shows a pressure vessel 100 and a vehicle body floor element 300 which can be configured in the same way as has been described in conjunction with FIG. 1. In a deviation here, the pressure relief trigger 210 is configured as a triggering line 217. Here, the triggering line 217 protrudes into the shell region of the pressure vessel. The triggering line 217 is set up to detect a thermal event in the shell region directly or indirectly, and to bring about the triggering of the pressure relief device 200 which can be activated thermally. For example, the triggering line 217 can be filled with a triggering medium which increases or reduces the pressure in the triggering line 217 in a manner which is dependent on the temperature. The triggering line 217 might likewise be a fuse or a heat pipe. The specific configuration of the triggering line 217 and the pressure relief device 200 can be any suitable configuration, in so far as, in particular, a thermal event immediately adjacently with respect to the triggering line 217 is detected by means of the triggering line 217 directly or indirectly, and in so far as the triggering line 217 is set up such that, in the case of the triggering temperature of the triggering line 217 being exceeded adjacently with respect to the thermal event, the triggering line 217 brings about the pressure relief by means of the pressure relief device 200. In accordance with the technology disclosed herein, a triggering line 217 of this type or an element which is connected operatively to it (here, is connected fluidically to it) can then be guided at least partially through the vehicle body floor element. For example, the hose or the pipe can run partially through the passenger interior compartment I and/or the trunk K. In the example which is shown here, an element (here, a head part) of the triggering line 217 opens into the passenger interior compartment I or trunk K. If a thermal event then occurs in the passenger interior compartment I or trunk K, the triggering medium in the head part is heated to a temperature above the triggering temperature. This brings about a pressure relief by means of the pressure relief device 200. The mechanism as disclosed in the German patent application with the application number DE 10 2018 203183 can be used, for example, as a pressure relief mechanism. The disclosure of DE 10 2018 203183 with regard to the pressure relief mechanism is hereby also incorporated by reference. By way of a configuration of this type, it is possible to detect thermal events at different locations.

For reasons of readability, the term "at least one" has been partially omitted for simplicity reasons. In so far as a feature of the technology disclosed herein is described in the singular or with an indefinite article (for example, the/a pressure vessel, the/a pressure relief trigger, the/a vehicle body floor element, the/a fiber reinforced layer, the/a liner, the/a opening element, etc.), its plurality is also intended to be disclosed at the same time (for example, the at least one pressure vessel, the at least one pressure relief trigger, the at least one vehicle body floor element, the at least one fiber reinforced layer, the at least one liner, the at least one opening element, etc.).

In the context of the technology disclosed herein, the term "substantially" (for example, "substantially perpendicular axis") comprises in each case the precise property or the precise value (for example, "perpendicular axis") and in each case insignificant deviations for the function of the property/the value (for example, "tolerable deviation from a perpendicular axis").

The preceding description of the present invention serves merely for illustrative purposes and not for the purpose of the restriction of the invention. Within the context of the invention, various amendments and modifications are possible without departing from the scope of the invention and its equivalents.

What is claimed is:

1. A motor vehicle with a pressure relief device which is activatable thermally for pressure relief of at least one pressure vessel, comprising:
   a vehicle body floor element arranged, at least in regions, between a passenger interior compartment or a trunk and the pressure vessel;
   a pressure relief trigger configured to bring about the pressure relief directly or indirectly, at least one surface of the pressure relief trigger being arranged at least partially in the passenger interior compartment or in the trunk, or being recessed into the vehicle body floor element; and
   a triggering medium stored in the pressure relief trigger, wherein
   the pressure relief trigger is configured to absorb thermal energy from the passenger interior compartment or from the trunk in order to trigger the pressure relief device, without the thermal energy which is absorbed for the triggering having previously been transmitted by way of the vehicle body floor element to the pressure relief trigger, and
   the pressure relief trigger is configured such that the triggering medium itself is transported for the transport of the thermal energy.

2. The motor vehicle according to claim 1, wherein the pressure relief device comprises at least one opening element which is activatable thermally, and the pressure relief trigger is configured to activate the opening element thermally.

3. The motor vehicle according to claim 2, wherein
the pressure relief trigger is configured to output the absorbed thermal energy at least partially to the opening element.

4. The motor vehicle according to claim 1, wherein
the pressure relief trigger is configured and arranged such that the triggering medium is brought at least partially into contact with the opening element for the thermal activation of the opening element.

5. The motor vehicle according to claim 4, wherein at least one of:
the triggering medium has a solid or liquid physical state if the temperature of the triggering medium is lower than a limit temperature, the limit temperature being indicative of a thermal event in the passenger interior compartment or in the trunk; and
the triggering medium has a liquid or gaseous physical state if the temperature of the triggering medium reaches or exceeds the limit temperature.

6. The motor vehicle according to claim 5, wherein
the pressure relief trigger is arranged and configured such that the triggering medium flows out for the pressure relief solely by the way of gravity and/or by way of a pressure difference between the triggering medium and surroundings.

7. The motor vehicle according to claim 1, wherein
the pressure relief trigger has at least one closure, the closure being configured to melt or to burst in case of a triggering temperature being reached or exceeded.

8. The motor vehicle according to claim 1, wherein
the pressure relief trigger comprises a triggering line, the triggering line or an element which is operatively connected to the triggering line is guided at least partially through the vehicle body floor element.

9. The motor vehicle according to claim 1, wherein
the triggering medium has a solid or liquid physical state if the temperature of the triggering medium is lower than a limit temperature, the limit temperature being indicative of a thermal event in the passenger interior compartment or in the trunk; and/or
the triggering medium has a liquid or gaseous physical state if the temperature of the triggering medium reaches or exceeds the limit temperature.

10. The motor vehicle according to claim 1, wherein
the pressure relief trigger is arranged and configured such that the triggering medium flows out for the pressure relief solely by the way of gravity and/or by way of a pressure difference between the triggering medium and surroundings.

11. A method for pressure relief of a motor vehicle, the motor vehicle comprising a pressure relief device for the pressure relief of at least one pressure vessel, the method comprising:
absorbing thermal energy of a thermal event at least partially by a triggering medium in a passenger interior compartment or in a trunk of the motor vehicle;
transporting the triggering medium, which is heated by way of the absorption, at least partially to an opening element of the pressure relief device, which opening element is activatable thermally, wherein
the transported triggering medium outputs the thermal energy at least partially to the opening element, as a result of which the opening element is activated thermally.

12. The method according to claim 11, wherein
the triggering medium is stored in a pressure relief trigger arranged at least partially in the passenger interior compartment or in the trunk.

13. The method according to claim 11, wherein
the triggering medium has a solid or liquid physical state if the temperature of the triggering medium is lower than a limit temperature, the limit temperature being indicative of a thermal event in the passenger interior compartment or in the trunk; and
the triggering medium has a liquid or gaseous physical state if the temperature of the triggering medium reaches or exceeds the limit temperature.

14. The method according to claim 11, wherein
the pressure relief trigger has at least one closure, the closure being configured to melt or to burst in case of a triggering temperature being reached or exceeded during the thermal event.

15. The method according to claim 11, wherein
the pressure relief trigger comprises a triggering line for transport of the triggering medium at least partially to the opening element.

* * * * *